United States Patent [19]

Savoca et al.

[11] Patent Number: 5,130,403

[45] Date of Patent: Jul. 14, 1992

[54] AMINE-BORON ADDUCTS AS REDUCED ODOR CATALYST COMPOSITIONS FOR THE PRODUCTION OF POLYURETHANES

[75] Inventors: Ann C. L. Savoca, Sinking Springs; Michael Louie, Bethlehem, both of Pa.

[73] Assignee: Air Products and Chemicals, Inc., Allentown, Pa.

[21] Appl. No.: 793,913

[22] Filed: Nov. 18, 1991

Related U.S. Application Data

[62] Division of Ser. No. 763,107, Sep. 20, 1991, Pat. No. 5,086,081.

[51] Int. Cl.$^5$ .............................................. C08G 18/08
[52] U.S. Cl. ........................................ 528/48; 528/54
[58] Field of Search ................................ 528/48, 54

[56] References Cited

U.S. PATENT DOCUMENTS

| | | | |
|---|---|---|---|
| 3,127,404 | 3/1964 | Mascioli | 260/268 |
| 3,193,515 | 7/1965 | Mascioli | 260/2.5 |
| 4,006,124 | 2/1977 | Welte et al. | 260/775 |
| 4,026,840 | 5/1977 | Bechara et al. | 260/25 |
| 4,425,444 | 1/1984 | White | 521/105 |
| 4,530,938 | 7/1985 | White | 521/105 |
| 4,611,013 | 9/1956 | Ashida | 521/105 |
| 4,857,560 | 8/1989 | Schmidt et al. | 521/103 |

FOREIGN PATENT DOCUMENTS 2301554 9/1976 France.

OTHER PUBLICATIONS

Koehler, Jackson, Lienhard "A Search for the Addition of Monodenate Nucleophiles to Boric and Benzeneboronic Acids in Water" J. Org. Chem. vol. 37, No. 14, 1972.

Ashida, Kaneyashi, "Unconventional Blowing Agents for Polyurethane Foams" pp. 153-173 99(6):39229a.

*Primary Examiner*—Morton Foelak
*Attorney, Agent, or Firm*—Michael Leach; James C. Simmons; William F. Marsh

[57] ABSTRACT

An amine-boron composition for catalyzing the urethane reaction, particularly in preparing a polyurethane foam, consisting essentially of the addition product of a tertiary amine and a boron compound of the formula $R_nB(OH)_{3-n}$ where $n=0$ or 1, and $R = C_1-C_8$ alkyl, $C_5-C_8$ cycloalkyl or $C_6-C_{10}$ aryl.

Preferred catalysts are prepared by mixing triethylenediamine with boric acid.

9 Claims, No Drawings

AMINE-BORON ADDUCTS AS REDUCED ODOR CATALYST COMPOSITIONS FOR THE PRODUCTION OF POLYURETHANES

This is a division of application Ser. No. 07/763,107 filed Sept. 20, 1991, now U.S. Pat. No. 5,086,081.

FIELD OF THE INVENTION

The present invention relates to the use of tertiary amines as catalysts for producing polyurethanes.

BACKGROUND OF THE INVENTION

The commercial production of polyurethanes via isocyanate poly addition reactions requires the use of catalysts. Tertiary amines were widely accepted in the industry as versatile polyurethane catalysts. They are generally stable in the presence of standard polyurethane formulation components and can impact both the blowing (water-isocyanate) and gelling (polyol-isocyanate) reactions. Unfortunately, a number of commonly used tertiary amine catalysts are relatively volatile and have an unpleasant smell. Even at low use levels, they may impart a noticeably pungent odor to the polyurethane formulation. It would be desirable to identify alternatives to standard tertiary amine catalysts which are not malodorous, yet exhibit the same type of activity in isocyanate polyaddition reactions.

One strategy for the reduction of odor associated with tertiary amine catalysts is the identification of less volatile structures. The literature teaches numerous techniques for reducing volatility, particularly increasing molecular weight or improving hydrogen bonding capability.

U.S. Pat. No. 4,026,840 describes the use of hydroxy-functionalized tertiary amines as polyurethane catalysts, particularly useful for the production of polyisocyanurate. In addition to lower volatility, such materials also contain reactive functionality which bind the amine into the final product. Typically, however, catalysts which are non-fugitive by way of reaction with isocyanate must be used at relatively high levels to compensate for immobilization of the tertiary amine functionality during urethane part production.

U.S. Pat. No. 4,006,124 which is an example of lower volatility being achieved by metal complex formation, describes the use of amidine-metal complexes as polyurethane catalysts.

U.S. Pat. No. 4,857,560 mentions reduced odor emission as an additional advantage of the disclosed expansion catalysts formed from tertiary amines and an acid mixture of (1) boric acid and (2) a carboxylic acid Unfortunately, strong organic acid containing catalysts tend to show masterbatch instability and corrosivity. Furthermore, carboxylic acid functionality is reactive with and can consume expensive isocyanate functionality, resulting in the formation of amide rather than the more standard urethane or urea segments in a resulting part.

Boric acid derivatives have not otherwise been used in combination with tertiary amines to effect amine odor reduction. Other uses of boric acid in polyurethane formulations, however, have been described CA 99(6):39229a notes that boric acid, when used as a filler at 10–40%, decelerates foaming in polyurethanes based on Laprol 805 and Lapramol 294 polyether polyols, polyisocyanate, Freon 113 and water.

"Int. Prog. Urethanes 1980", 2, 153–73 describes the use of boric acid as a blowing agent, its behavior being almost equal to that of water. Neither reference describes the effect of boric acid at use levels typified by a catalyst, nor do they indicate the effect of boric acid on polyurethane catalysis in the presence of a tertiary amine.

U.S. Pat. No. 4,611,013 describes the use of quarternary ammonium borates to effect the concurrent trimerization/carbodiimidization of polyisocyanates. The borates are prepared from boric acid, alcohols and quarternary ammonium hydroxides and as such are not derived from tertiary amines. Other examples are given by U.S. Pat. No. 4,530,938 and 4,425,444.

U.S. Pat. No. 3,193,515; U.S. Pat. No. 3,127,404 and FR 2,301,554 disclose the use of boric acid in the preparation of an ammonium salt polyurethane catalyst from triethylenediamine and a glycol borate acid. Glycol borate acids are prepared by heating mixtures containing not substantially less than 0.5 moles of boric acid per mole glycerol or alternative vicinal glycol to effect acid complex formation. The advantage of such catalyst composition is delayed activity and/or accelerated cure. Unfortunately, the preferred catalyst compositions are highly viscous because a low glycol/boric acid ratio is required to minimize the amount of glycol delivered into a formulation. The addition of low molecular weight glycol into polyurethane parts, particularly foam parts, is typically avoided to prevent unnecessary consumption of expensive isocyanate. Further, glycols can negatively impact physical properties.

"J. Org. Chem." 1972, 37 (14), 2232 discloses that monodentate nitrogen nucleophiles do not react significantly with boric acid in aqueous solution.

SUMMARY OF THE INVENTION

The present invention provides a composition for catalyzing the reaction between an isocyanate and a compound containing a reactive hydrogen, e.g. the urethane reaction for making polyurethane. The catalyst composition consists essentially of a tertiary amine urethane catalyst in combination with a boron compound of the formula $R_nB(OH)_{3-n}$ where
  $n = 0$ or 1, and
  $R = C_1-C_8$ alkyl, $C_5-C_8$ cycloalkyl or $C_6-C_{10}$ aryl.

As an advantage of these catalyst compositions there is a significant reduction in amine odor compared to standard polyurethane catalyst compositions containing volatile tertiary amines. Improved reactivities and physical properties have been noted when such amine-boron compositions are used as catalysts for isocyanate polyaddition reactions.

Other distinct advantages over boron-containing prior art catalyst compositions include reduced viscosity and lower corrosivity.

DETAILED DESCRIPTION OF THE INVENTION

The catalyst compositions according to the invention can catalyze the reaction between an isocyanate functionality and an active hydrogen-containing compound, i.e. an alcohol, an amine or water, especially the urethane (gelling) reaction to make polyurethanes and the blowing reaction of water with isocyanate to release carbon dioxide for making foamed polyurethanes, or the trimerization of the isocyanate functionality to form polyisocyanurates.

The polyurethane products are prepared using suitable organic polyisocyanates well known in the art including, for example, hexamethylene diisocyanate, phenylene diisocyanate, toluene diisocyanate ("TDI") and 4,4'-diphenylmethane diisocyanate. Especially suitable are the 2,4- and 2,6-TDIs individually or together as their commercially available mixtures. Other suitable isocyanates are mixtures of diisocyanates known commercially as "crude MDI", also known as PAPI, which contain about 60% of 4,4'-diphenylmethane diiso- cyanate along with other isomeric and analogous higher polyisocyanates. Also suitable are "prepolymers" of these polyisocyanates comprising a partially prereacted mixture of polyisocyanates and polyether or polyester polyols.

Illustrative of suitable polyols as a component of the polyurethane composition are the polyalkylene ether and polyester polyols. The polyalkylene ether polyols include the poly(alkylene oxide) polymers such as poly-(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols including those produced by reacting a dicarboxylic acid with an excess of a diol, for example, adipic acid with ethylene glycol or butanediol, or reacting a lactone with an excess of a diol such as reacting caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20-80% of the polyol portion of the masterbatch.

Other typical agents found in the polyurethane foam formulations include crosslinkers such as ethylene glycol, butanediol, diethanolamine, diisopropanolamine, triethanolamine and/or tripropanolamine; blowing agents such as water, methylene chloride, trichlorofluoromethane and the like; and cell stabilizers such as silicones.

A general polyurethane flexible foam formulation containing the catalyst composition according to the invention would comprise the following components in parts by weight (pbw):

| Flexible Foam Formulation | |
|---|---|
| | Parts by Weight |
| Polyol | 20-80 |
| Polymer Polyol | 80-20 |
| Silicone Surfactant | 1-2.5 |
| Blowing Agent | 2-4.5 |
| Crosslinker | 0.5-2 |
| Catalyst | 0.5-2 |
| Isocyanate Index | 92-115 |

The urethane catalyst composition consists essentially of the addition product, or adduct, of a tertiary amine urethane catalyst and a boron compound of the general formula: $R_nB(OH)_{3-n}$
where n is 0 or 1, and R is $C_1-C_8$ alkyl, $C_5-C_8$ cycloalkyl or $C_6-C_{10}$ aryl.

Alkyl groups would include, for example, methyl, ethyl, butyl, ethylhexyl and the like; cycloalkyl would include, for example, cyclopentyl, cyclohexyl and the like; and aryl groups would include, for example, phenyl, p-tolyl and the like.

Exemplary of suitable boron compounds are boric acid, phenylboronic acid and isopropylboronic acid. The preferred boron compound is boric acid where n is 0. Contemplated as functional equivalents to boric acid for purposes of this invention are the borate esters, i.e., alkyl-, dialkyl- and trialkylborates, in which the alkoxy groups hydrolyze to the hydroxyl functionality in the presence of water.

It is also contemplated that any tertiary amine suitable as a urethane catalyst can be used in making the amine-boron adduct catalyst composition. Illustrative of suitable tertiary amine urethane catalysts are pentamethyldiethylenetriamine, pentamethyldipropylenetriamine, bis(dimethylaminoethyl) ether, dimethylcyclohexylamine, N,N,N'-trimethyl-N'-hydroxyethylethylenediamine, triethylenediamine ("TEDA") and the like.

Typical molar ratios of tertiary nitrogen to boron in making the catalyst composition are from 1:0.01 to 1:100, preferably 1:0.1 to 1:10, most preferably 1:0.5 to 1:1.

Such catalyst compositions are generally easily handled solids which are prepared by precipitation from appropriate solvents upon mixing the tertiary amine with the boron compound at temperatures from ambient (or lower) to about 50° C., i.e. without substantial heating, and any convenient pressure, especially atmospheric pressure. In addition, solid adducts are afforded upon mixing the tertiary amine and the boric acid in a non-solvent for the adduct, again without the need for substantial heating. For example, TEDA and boric acid can be blended in tetrahydrofuran or methoxyethoxyethanol to yield a solid product.

The amine-boron adducts are also easily prepared and more conveniently delivered as solutions in carriers such as water, alcohols, polyols, amines, polyamines, ethers, hydrocarbons and chlorinated hydrocarbons. The preferred carriers are water, alcohols and polyols. The more preferred carriers are standard polyurethane additives such as water, crosslinkers (e.g., diethanolamine), chain extenders (e.g., butanediol), and higher molecular weight polyether and polyester polyols. When using phenylboronic acid, it is preferred first to dissolve the tertiary amine in the carrier and then add the phenylboronic acid.

A catalytically effective amount of the catalyst composition is used in the polyurethane formulation. More specifically, suitable amounts of the catalyst composition may range from about 0.01 to 10 parts per 100 parts polyol in the polyurethane formulation.

The catalyst compositions may be used in combination with other tertiary amine and organotin urethane catalysts well known in the urethane art.

These catalyst compositions have the advantage of substantially reduced amine odor relative to standard tertiary amines while exhibiting comparable or improved catalytic activity. The catalyst composition also manifests reduced viscosity and lower corrosivity.

The following automotive formulation master batches were used in the Examples:

| Automotive Formulation Master Batch I | |
|---|---|
| PLURACOL 816 (conventional polyether polyol) pphp | 40 |
| PLURACOL 1003 (styrene-acrylonitrile filled) polymer polyol | 60 |
| DC 5243 (silicone surfactant) | 1.2 |
| DEOA-LF (85 wt % diethanolamine in water) | 1.75 |

| Automative Formulation Master Batch II | |
|---|---|
| Multranol 9143 (conventional polyether polyol) pphp | 50 |
| Multranol 9151 (PHD filled polymer polyol) | 50 |
| DC 5043 (silicone surfactant) | 1.75 |
| DEOA-LF | 2.0 |

EXAMPLE 1

A 1:2 molar mixture of BL22 catalyst (a 70:30 wt/wt mixture of pentamethyldiethylenetriamine and pentamethyldipropylene- triamine) and boric acid was prepared according to the following procedure. BL22 catalyst (25g), boric acid (17g), and water 42g) were combined and dissolved at room temperature over 30 min. The resulting solution had minimal, if any, amine odor.

EXAMPLE 2

A 1:3 molar mixture of BL22 catalyst and boric acid was prepared according to the following procedure. BL22 catalyst (25g), boric acid (26g), and water (51g) were combined and dissolved at room temperature over 30 min. The resulting solution had minimal, if any, amine odor.

EXAMPLE 3

A 1:2 molar mixture of triethylenediamine ("TEDA") and phenylboronic acid was prepared by combining TEDA (1.25g), phenylboronic acid (2.75g), ethylene glycol (6.2g) and diethylene glycol (9.8g) and dissolving with mild heating (~40° C.) over several minutes. The resulting solution had minimal, if any, amine odor.

EXAMPLE 4

A 1:2 molar mixture of TEDA and boric acid was prepared by combining TEDA (118.5g), boric acid (131.1g) and water (250g) and dissolving at room temperature over 30 min.

The following Comparative Example 5 to Example 16 demonstrate that these reduced odor amine-boron compositions exhibit equivalent or improved reactivity when compared to standard tertiary amine catalysts for the production of flexible molded polyurethane foam. Foams prepared using the new catalyst compositions have physical properties which compare well to those for foams prepared using industry standard catalysts.

COMPARATIVE EXAMPLE 5 AND EXAMPLE 6

PHD polyol based formulations were prepared from master batch formulation II in which the DEOA-LF level was 1.75 pphp, 2.8 pphp water and (a) 0.50 pphp DABCO 33LV ® catalyst with 0.12 pphp DABCO ® BL-11 catalyst as the Comparative Example 5 control catalyst or (b) 1.2 pphp of a 50 wt% aqueous solution of 1:2 TEDA and boric acid (TEDA:BA) of the Example 4 catalyst. Foams were prepared on an Elastogran PU-20 machine by combining each of the above formulations with an 80:20 mixture of 2,4- and 2,6-TDI at a 1.05 molar ratio of isocyanate to active hydrogen functionality in a 140° F. (60° C.) mold for 4 min. Catalyst performance and physical properties are given in Table A.

TABLE A

| Catalyst | DABCO 33LV/BL-11 | TEDA:BA |
|---|---|---|
| Initiation time$^a$ (sec) | 5.83$^b$ | 5.80$^c$ |
| Extrusion time (sec) | 31.04$^b$ | 30.91$^c$ |
| String Gel time (sec) | 42.64$^b$ | 39.85$^c$ |
| Extrusion weight (g) | 41$^b$ | 16.9$^c$ |
| Pad weight (g) | 628.4$^b$ | 606.6$^c$ |
| ILD-25% | 34.8$^c$ | 35.0$^c$ |
| ILD-65% | 110.0$^c$ | 105.8$^c$ |
| ILD-25% R | 28.0$^c$ | 28.3$^c$ |
| Density (lb/ft$^3$) | 2.07$^c$ | 2.09$^c$ |
| Airflow (ft$^3$/min) | 1.36$^c$ | 1.50$^c$ |
| Tear (psi) | 1.47$^c$ | 1.53$^c$ |
| Tensile (psi) | 16.95$^c$ | 19.21$^c$ |
| Strain (%) | 76.98$^c$ | 90.71$^c$ |
| Ball Rebound (in) | 45.00$^c$ | 49.50$^c$ |
| Compression set 50% | 7.96$^c$ | 8.07$^c$ |

$^a$cream time
$^b$average of three shot sizes-4.00, 3.85 and 3.60 sec
$^c$average for foams poured at minimum fill (3.60 sec shot)

COMPARATIVE EXAMPLE 7

The control catalysts, 0.35 pphp DABCO 33LV catalyst (containing 33 wt% TEDA and 67 wt% dipropylene glycol) and 0.24 pphp BL22 catalyst, and 2.9 pphp water (3.2 pphp total water) were added to automotive formulation master batch I and mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| top of cup 1 (sec) | 9.33 |
|---|---|
| top of cup 2 (sec) | 26.13 |
| string gel (sec) | 45.49 |
| full rise (sec) | 60.38 |
| initial full rise (mm) | 407.56 |
| final full rise (mm) | 367.52 |

EXAMPLE 8

An experimental catalyst, 0.81 pphp of a 50 wt% aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and mixed well for 30 sec immediately prior to adding 41.6 pphp of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was measured immediately and again after aging for 24h.

| | |
|---|---|
| top of cup 1 (sec) | 9.90 |
| top of cup 2 (sec) | 26.50 |
| string gel (sec) | 47.14 |
| full rise (sec) | 58.77 |
| initial full rise (mm) | 409.22 |
| final full rise (mm) | 347.25 |

EXAMPLE 9

An experimental catalyst, 0.98 pphp of a 50 wt% aqueous solution of 1:3 BL22 catalyst and boric acid prepared according to Example 2 (equivalent to 0.24 pphp BL22 catalyst), 0.35 pphp DABCO 33LV catalyst, and 2.4 pphp water (3.2 pphp total water) were added to master batch formulation I and mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| | |
|---|---|
| top of cup 1 (sec) | 10.73 |
| top of cup 2 (sec) | 28.27 |
| string gel (sec) | 46.92 |
| full rise (sec) | 61.46 |
| initial full rise (mm) | 409.68 |
| final full rise (mm) | 348.19 |

COMPARATIVE EXAMPLE 10

The control catalysts, 0.35 pphp DABCO 33LV catalyst and 0.24 pphp BL22 catalyst, and 2.9 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was measured immediately and again after aging for 24h.

| | |
|---|---|
| top of cup 1 (sec) | 9.68 |
| top of cup 2 (sec) | 26.29 |
| string gel (sec) | 44.79 |
| full rise (sec) | 59.05 |
| initial full rise (mm) | 409.14 |
| final full rise (mm) | 367.54 |

EXAMPLE 11

An experimental catalyst, 0.81 pphp of a 50 wt% aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and allowed to age for 15h, then mixed well for 30 sec immediately prior to adding 41.6 ppph of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was measured immediately and again after aging for 24h.

| | |
|---|---|
| top of cup 1 (sec) | 10.89 |
| top of cup 2 (sec) | 28.00 |
| string gel (sec) | 47.64 |
| full rise (sec) | 59.94 |
| initial full rise (mm) | 412.86 |
| final full rise (mm) | 356.48 |

EXAMPLE 12

An experimental catalyst, 0.98 pphp of a 50 wt% aqueous solution of 1:3 BL22 catalyst and boric acid prepared according to Example 2 (equivalent to 0.24 pphp BL22 catalyst), 0.35 pphp DABCO 33LV catalyst, and 2.4 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| | |
|---|---|
| top of cup 1 (sec) | 11.93 |
| top of cup 2 (sec) | 30.19 |
| string gel (sec) | 52.20 |
| full rise (sec) | 63.47 |
| initial full rise (mm) | 411.90 |
| final full rise (mm) | 356.37 |

COMPARATIVE EXAMPLE 13

The control catalysts, 0.35 pphp DABCO 33LV catalyst and 0.24 pphp BL22 catalyst, and 2.9 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| | |
|---|---|
| extrusion (sec) | 27.21 |
| string gel (sec) | 36.26 |
| foam weight (g) | 180.2 |

EXAMPLE 14

An experimental catalyst, 0.81 pphp of a 50 wt% aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| extrusion (sec) | 27.99 |
|---|---|
| string gel (sec) | 38.83 |
| foam weight (g) | 174.0 |

COMPARATIVE EXAMPLE 15

The control catalysts, 0.35 pphp DABCO 33LV catalyst and 0.15 pphp DABCO BL-11 catalyst, and 2.9 pphp water (3.2 pphp total water) were added to master batch formulation II and mixed well for 30 sec prior to adding 42.0 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| extrusion (sec) | 34.75 |
|---|---|
| string gel (sec) | 44.17 |
| foam weight (g) | 189.6 |
| residual weight (g)* | 46.4 |
| extrusion weight (g) | 28.0 |

*weight of foam remaining in the cup after pouring into the mold

EXAMPLE 16

As experimental catalyst, 0.59 pphp of a 20 wt% solution of 1:2 TEDA and phenylboronic acid in a diethylene glycol/ethylene glycol mixture prepared according to Example 3, 0.25 pphp DABCO 33LV catalyst, 0.15 pphp DABCO BL-11 catalyst, and 2.0 pphp water (3.2 pphp total water) were added to master batch formulation II and mixed well for 30 sec prior to adding 42.9 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| extrusion (sec) | 39.63 |
|---|---|
| string gel (sec) | 49.43 |
| foam weight (g) | 188.4 |
| residual weight (g)* | 45.2 |
| extrusion weight (g) | 32.5 |

*weight of foam remaining in the cup after pouring into the mold

Solutions of tertiary amines and the boron compounds $R_nB(OR')_{3-n}$ can have much lower viscosity at comparable solids than previously reported amine-boron catalyst compositions. Low viscosity compositions are conveniently handled, whereas highly viscous materials often need to be heated to enable delivery into a commercial formulation.

COMPARATIVE EXAMPLE 17

The glycerol borate acid salt of TEDA was prepared according to U.S. Pat. No. 3,113,515. Boric acid was combined with 2 molar equivalents of glycerol and heated to 180° F. to afford a glycerol borate acid. The reaction mixture was then cooled to 100° F. and treated with 1 molar equivalent of TEDA. Further cooling afforded a viscous material containing 30 wt% TEDA which had a measured Brookfield viscosity of 14,800 centipoise at 25° C.

EXAMPLE 18

An aqueous 1:1 TEDA/boric acid molar mixture was prepared by dissolving TEDA in water and adding 1 molar equivalent of boric acid under ambient conditions. Dissolution of the boric acid was rapid, resulting in a modest exotherm (<50° C.). The resulting solution which was 33 wt% TEDA and 50 wt% solids had a measured Brookfield viscosity of 16 centipoise at 25° C.

Catalyst compositions of this invention have also been found to be non-corrosive according to a standard static NACE corrosivity test. Comparable strong acid blocked tertiary amine catalysts exhibit variable, however, typically significant, corrosion of carbon steel.

EXAMPLE 19

A series of tertiary amine/boric acid compositions was evaluated for corrosivity according to a standard static NACE corrosivity test. Coupons prepared from 1010 carbon steel were partially submerged in the catalyst solution. Corrosion as measured for the liquid and vapor phase contact as well as at the liquid/vapor interface. Comparative data was obtained for several commercially available acid blocked tertiary amine catalysts. The following Table B summarizes the results.

TABLE B

| | Catalyst Corrosivity | |
|---|---|---|
| Catalyst | Environment | Corrosion Rate |
| TEDA/H$_3$BO$_3$[a] | liquid | <0.10 mils/yr |
| TEDA/H$_3$BO$_3$ | liquid | 0.11 mils/yr |
| TEDA/H$_3$BO$_3$ | liquid/vapor | — |
| TEDA/H$_3$BO$_3$ | vapor | <0.10 mils/yr |
| TEDA/H$_3$BO$_3$ | vapor | <0.10 mils/yr |
| DABCO 8154[b] | liquid | 12.2 mils/yr |
| DABCO 8154 | liquid | 10.9 mils/yr |
| DABCO 8154 | liquid/vapor | — |
| DABCO 8154 | vapor | <0.10 mils/yr |
| DABCO 8154 | vapor | <0.10 mils/yr |
| BL-22/H$_3$BO$_3$[c] | liquid | <0.10 mils/yr |
| BL-22/H$_3$BO$_3$ | liquid | |
| BL-22/H$_3$BO$_3$ | liquid/vapor | — |
| BL-22/H$_3$BO$_3$ | vapor | <0.10 mils/yr |
| BL-22/H$_3$BO$_3$ | vapor | |
| DABCO BL-17[d] | liquid | 4 mils/yr |
| DABCO BL-17 | liquid | |
| DABCO BL-17 | liquid/vapor | significant visible etching at interface (~1/16-⅛ deep) |
| DABCO BL-17 | vapor | <0.10 mils/yr |
| DABCO BL-17 | vapor | |

[a]Example 4 catalyst
[b]Acid blocked catalyst
[c]Example 1 catalyst
[d]Acid blocked catalyst We have also found that these reduced odor tertiary amine/boron catalyst compositions provide physical property improvements. The glycerol borate acid/TEDA composition described in U.S. Pat. No. 3,113,515 afforded significant foam shrinkage in uncrushed molded foams. We have found that TEDA/boric acid compositions in water do not cause such shrinkage in five vent, hand-mixed molded foams.

COMPARATIVE EXAMPLE 20

The control catalyst, 1.0 pphp DABCO 33LV catalyst and 2.8 pphp water (3.2 pphp total water) were added to master batch formulation II. Foams were made over 8 days by combining this formulation with 43.09 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114 mm).

| extrusion (sec) | 32.1 (av) |
|---|---|
| string gel (sec) | 39.6 (av) |
| foam weight (g) | 197.0 (av) |
| foam thickness (mm) | 107 (av) |
| foam shrinkage (%) | 6 (av) |

COMPARATIVE EXAMPLE 21

A comparative catalyst, 1.10 pphp of TEDA/glycerol borate acid prepared according to Comparative Example 17 (containing 30 wt% TEDA), and 2.8 pphp water (3.2 pphp total water) were added to master batch formulation II. Foams were made over 8 days by combining this formulation with 43.79 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114 mm).

| extrusion (sec) | 34.3 (av) |
|---|---|
| string gel (sec) | 43.4 (av) |
| foam weight (g) | 191.6 (av) |
| foam thickness (mm) | 98 (av) |
| foam shrinkage (%) | 14 (av) |

EXAMPLE 22

An experimental catalyst, 1.00 pphp of a 50 wt% aqueous solution of 1:1 TEDA/boric acid (containing 33 wt% TEDA) from Example 18, and 2.3 pphp water (3.2 pphp total water) were added to master batch formulation II. Foams were made over 8 days by combining this formulation with 42.18 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114mm).

| extrusion (sec) | 31.6 (av) |
|---|---|
| string gel (sec) | 39.4 (av) |
| foam weight (g) | 192.3 (av) |
| foam thickness (mm) | 111 (av) |
| foam shrinkage (%) | 2.6 (av) |

STATEMENT OF INDUSTRIAL APPLICATION

The present invention provides an amine catalyst composition for making polyurethane foam products which exhibits reduced odor, reduced viscosity and lower corrosivity.

We claim:

1. In a method for catalyzing the reaction between an isocyanate and an active hydrogen-containing compound, the improvement which comprises employing a catalyst composition consisting essentially of triethylenediamine and a boron compound of the formula $R_nB(OH)_{3-n}$ where $n = 0$ or 1, and $R = C_1-C_8$ alkyl, $C_5-C_8$ cycloalkyl or $C_6-C_{10}$ aryl.

2. The method of claim 1 in which the catalyst composition is employed in combination with a tertiary amine urethane catalyst or an organotin urethane catalyst, or both.

3. The method of claim 1 in which the boron compound is boric acid, phenylboronic acid or isopropylboronic acid.

4. The method of claim 1 in which the boron compound is boric acid.

5. The method of claim 1 in which the tertiary nitrogen to boron molar ratio of the catalyst composition is 1:0.01 to 1:100.

6. The method of claim 1 in which the tertiary nitrogen to boron molar ratio of the catalyst composition is 1:0.1 to 1:10.

7. The method of claim 1 in which the tertiary nitrogen to boron molar ratio of the catalyst composition is 1:0.5 to 1:1.

8. The method of claim 4 in which the tertiary nitrogen to boron molar ratio of the catalyst composition is 1:0.5 to 1:1.

9. The method of claim 8 in which the catalyst composition is employed in combination with a tertiary amine urethane catalyst or an organotin urethane catalyst, or both.

* * * * *